United States Patent
Borel et al.

[11] Patent Number: 5,822,025
[45] Date of Patent: Oct. 13, 1998

[54] SINGLE LIGHT VALVE COLOR PROJECTION SYSTEM

[75] Inventors: Thierry Borel, Iilkirch; Khaled Sarayeddine, Schiltigheim, both of France

[73] Assignee: Thomason multimedia S.A., Courbevoie, France

[21] Appl. No.: 602,182

[22] Filed: Feb. 15, 1996

[30] Foreign Application Priority Data

Feb. 27, 1995 [FR] France ................................. 95 02230

[51] Int. Cl.⁶ .............................................. G02F 1/1335
[52] U.S. Cl. ................................................ 349/5; 349/8
[58] Field of Search ............................... 349/5, 7, 8

[56] References Cited

U.S. PATENT DOCUMENTS

| 5,398,082 | 3/1995 | Henderson et al. | 349/5 |
| 5,517,340 | 5/1996 | Doany et al. | 349/5 |
| 5,548,349 | 8/1996 | Mizuguchi et al. | 349/5 |

FOREIGN PATENT DOCUMENTS

| 0601666 | 6/1994 | European Pat. Off. . | |
| 5-134210 | 5/1993 | Japan | 349/5 |
| 6-214250 | 8/1994 | Japan | 349/8 |
| WO-A-94 28672 | 12/1994 | WIPO . | |

OTHER PUBLICATIONS

Patent Abstracts of Japan vol. 18 No. 194 (P–1722) Apr. 5, 1994 & JP-A-06 003639 Jan. 14, 1994.

Patent Abstracts of Japan vol. 13 No. 503 (E–844) Nov. 13, 1989 & JP-A-01 200795 Aug. 11, 1989.

*Primary Examiner*—William L. Sikes
*Assistant Examiner*—James A. Dudek
*Attorney, Agent, or Firm*—Joseph S. Tripoli; Frederick A. Wein

[57] ABSTRACT

A high performance single light valve color projection system that enables sequential display of color, and an addressing process for this system. Several rotating glass plates are sequentially inserted between the light valve and the objective. These glass plates create a spatial offset of the image of light valve pixels three times per frame on the projection screen. The sets of plates are rotated by a motor with an axis parallel to the optical axis of the motor, and intersect the image beam at each image frame.

14 Claims, 6 Drawing Sheets

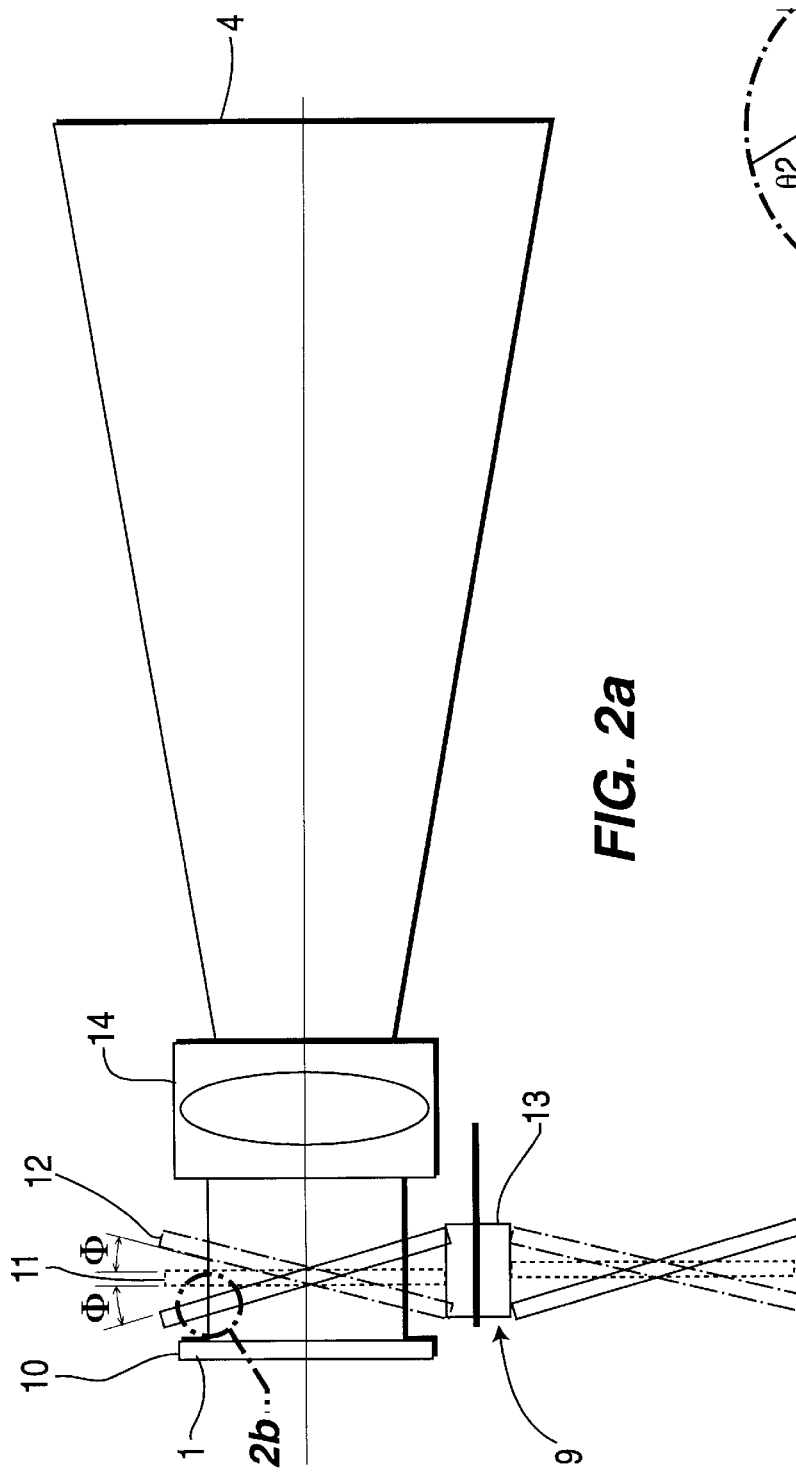
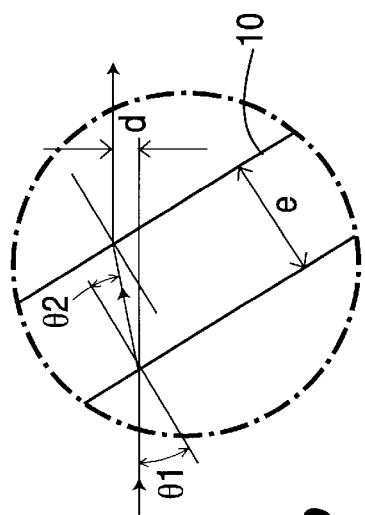
FIG. 2a
FIG. 2b

SINGLE LIGHT VALVE COLOR PROJECTION SYSTEM

BACKGROUND OF THE INVENTION

This invention concerns a high performance and easy to install single light valve color projection system capable of a sequential display of colors, and a process for addressing this system.

A projection system through an LCD usually consists of a metallic halogen or Xenon arc lamp positioned at the focal point of a parabolic or elliptical reflector on which a condenser is installed. White light emitted by the lamp is reflected in the reflector and transmitted through a field lens to a liquid crystal screen or an electro-optical modulator operating as a light valve. In general, these modulators have a TFT (Thin Film Transistor) structure, each pixel being controlled by a TFT transistor and addressed by drivers (peripheral circuits). The liquid crystal is of the "twisted nematic" type and works with linearly polarized light. The image is transmitted through the liquid crystal screen and is then displayed on a screen through a system of lenses.

In the case of a single light valve color system, the liquid crystal screen includes three pixels, one red (R), green (G) and blue (B) for each image point, and therefore its definition is only one third as good as the definition of a three light valve system (one screen for each color) in which the R, G and B images are superposed. Furthermore, typical single light valve systems use absorbent color filters to form the R, G and B color pixels. Each pixel consists of a filter that absorbs the complementary colors. This results in a loss of ⅔ of the flux of incident light on the light valve. These two points (low resolution and flux) are the major disadvantages of the single light valve system at the present time. Other solutions suggest working with triple resolution by sequencing colors, the problem being that the response time of active matrix liquid crystal screens is not yet sufficient to display the three colors sequentially. However, solutions are available to improve the response time using ferroelectric cells or other liquid crystal structures.

Several solutions are available for sequentially displaying colors on the screen for these single light valve color systems. The first is to sequence colors using a wheel composed of a number of segments of R, G, B absorbent filters passing in front of and covering the LCD during a sub-frame, while the wheel rotates in front of the light valve. This solution is described in detail in the "An improved Frame-Sequential Color Projector with Modified CdSe-TFTs" (SID 91 Digest page 427) article by DOBLER et al. The main disadvantage of this method is that ⅔ of the incident light is lost. Furthermore, opaque zones have to be inserted between filters in order to avoid desaturation of colors and drag caused by the insufficient response rate of the liquid crystal. This significantly reduces the efficiency of the light which is a crucial problem for projection systems. This method also induces another problem. If the R, G and B sub-frames are put into sequence, a "breakup" phenomenon occurs in which the spectator's eye, as it moves in front of the screen, will see colors on the edge of objects that are displayed. This is due to the fact that the position of the image in the eye is not the same for each color.

Another solution is to divide light from a lamp into three color beams using a system of dichroic mirrors, and to insert a rotating prism between this system and the field lens in front of the light valve, in order to sequence beams on the screen. This solution is described in detail in the article "A Novel Single Valve High Brightness HD Color Projector" by P. Janssen (Philips). The problem is that this solution is difficult to implement because of the rotation of a (heavy) prism, and furthermore the deflection of color beams is not uniform due to the fact that the refraction relation n 1sinθ1= n2sinθ2 is not linear for large values of the angle of incidence, which causes desaturation of colors in scanning areas separating the three color stripes.

SUMMARY OF THE INVENTION

This invention solves problems caused by previously known solutions and proposes a simple, reliable and efficient system based on the deflection of a beam by a glass plate. This invention consists of inserting several sequentially rotating glass plates between the light valve and the objective. These glass plates create spatial shifts of the image of light valve pixels three times per frame on the projection screen.

More precisely, this invention concerns a single light valve color projection system comprising an illuminating device lighting a color light valve controlled by an addressing device and composed of pixels for which the image is displayed on a projection screen through an objective, and also comprising at least one set of three glass plates between the light valve and the objective.

This or these sets of three plates rotate and intersect the image beam at each image frame.

In any one set, the plates are inclined with respect to the light valve, such that any one image is offset on the projection screen by a distanced equal to the distance between the geometric centers of adjacent color pixels in the light valve.

One of the plates in one of the sets may be parallel to the light valve, and the two others may be inclined by the same positive and negative angle±Ø with respect to this first plate.

All plates have the same thickness e and, in the same set, the angle of inclination of the plates with respect to the plate parallel to the light valve is related to this thickness by the following relation:

$$d=e \cdot (\mathrm{Sin}\ (\theta 2-\theta 1/\mathrm{Cos}\ (\theta 2)),$$

where d is the distance between two adjacent pixels, e is the thickness of the glass plate, θ1 and θ2 are the air-plate and plate-air angles of incidence of the inclined plates, respectively. The relation between θ1 and θ2 is given by the simple refraction relation n1.sinθ1=n2.sin θ2 where n1 and n2 are the reflection indexes of air n1 (=1) and glass n2 respectively.

Each plate is fixed at its base to a motor, the axis of which is parallel to the optical axis of the system.

The motor frequency is synchronous with the line frequency and light valve frame and with the addressing device multiplexer.

Preferably, each plate has an opaque area along the motor beam so that the light valve can be switched when necessary.

The light valve used in the system is preferably a liquid crystal screen in which the pixel structure is in delta, in rows or in columns.

This invention also concerns a first addressing mode for this type of projection system, in which it has a memory for each of the red, green, blue colors, with the same number of addresses as there are pixels on the light valve, the pointer of a common addressing bus being synchronized with a multiplexer such that series of sub-frames are displayed in which a red, green or blue pixel at t−1 becomes blue, red and green at t, and green, blue and red at t+1, respectively.

This invention also concerns a second addressing mode for this type of projection system with a memory for each of the three red, green and blue colors, with one address for each pixel in the light valve, each of the outputs of the three memories being conducting alternately during each clock pulse.

The system according to the invention is completely independent so that colors are obtained on each pixel and can be used with absorbent or interference color filters made directly on the liquid crystal screen or with any other method creating color pixels (for example by illumination). Furthermore, for example this system can be used to create a white pixel from the three R, G and B pixels regardless of the position of these color pixels in the LCD. It is sufficient to choose the center of gravity of the three R, G and B triplets and thus calculate the angle necessary at each plate to deviate the corresponding color pixel so that it lands on this center of gravity. Furthermore, there are always three colors per sub-frame, thus avoiding bothersome breakup phenomena obtained in solutions recommended in prior art. Another advantage is that multiplexing appears much simpler for the addressing electronics and for the optical elements.

BRIEF DESCRIPTION OF THE DRAWINGS

This invention will be better understood and additional advantages will become apparent in reading the description illustrated by the following figures:

FIG. 2a shows a preferred embodiment for this invention,

FIG. 2b shows the optical path of a beam passing through a glass plate and illustrates one of the main characteristics of the invention;

DETAILED DESCRIPTION OF THE INVENTION

Figure 1:
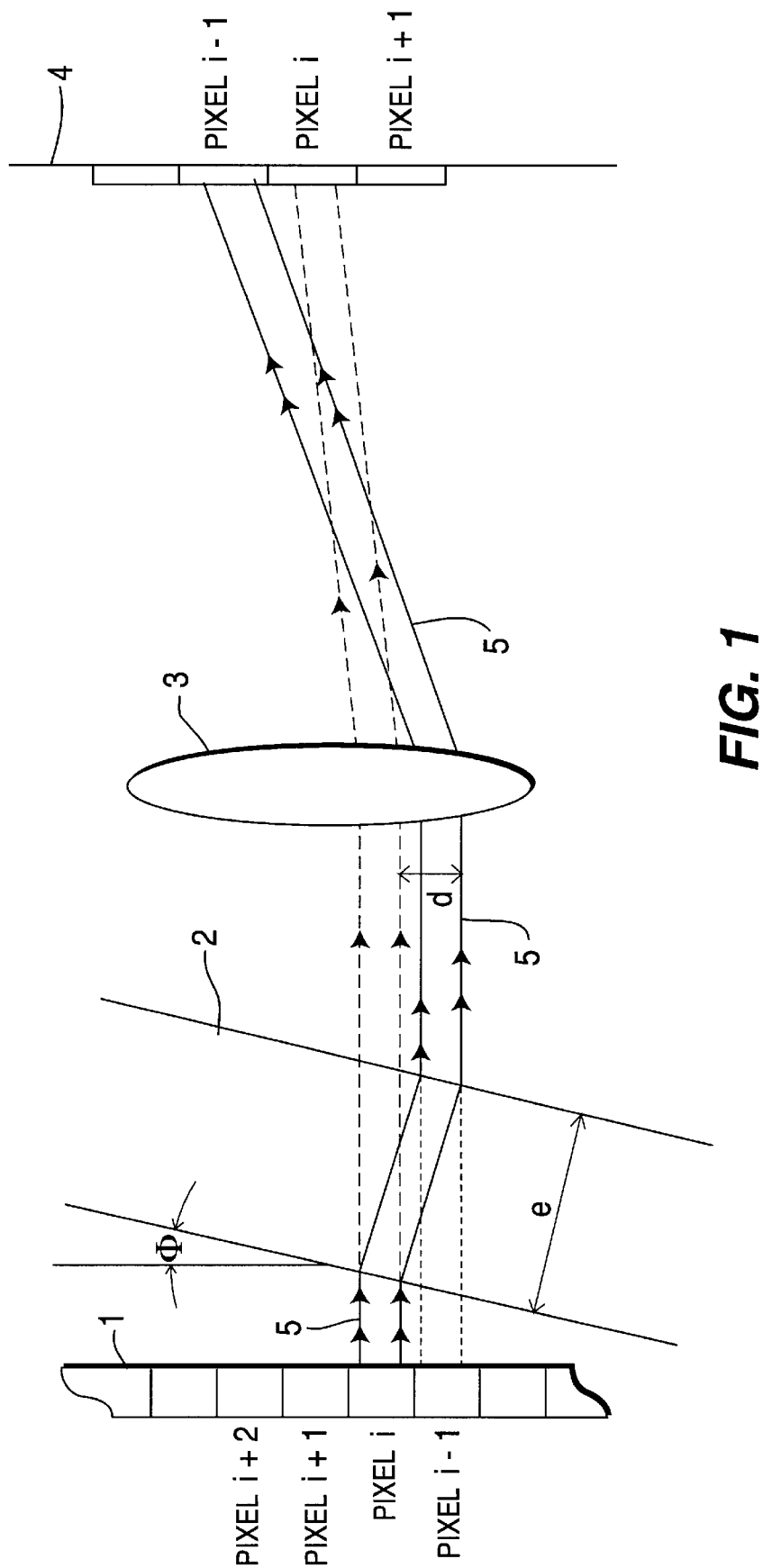
FIG. 1 shows the operating principle of the system according to this invention.

On FIG. 1, the light originating from the lamp-reflector illumination system (not shown on the figure) passes through light valve 1 which may, for example, be an active matrix liquid crystal screen. This light valve 1 is composed of a set of pixels i−1, i, i+1 and i+2 the image of which must be projected through an objective 3 onto screen 4. An important characteristic of the invention is that the image from light valve 1 passes through rotating glass plates 2 which have three different positions inclined with respect to the z optical axis of the system.

At time t, when glass plate 2 is parallel to light valve 1 (Ø=0), in other words perpendicular to the z optical axis, the image of pixel 1 is displayed on screen 4 classically according to the optical path shown in dotted lines on the figure. At time t+1, the glass plate 2 is inclined at a particular angle Ø with respect to the perpendicular to the z optical axis, and the image of pixel i originating from light valve 1 follows optical path 5 parallel to the z optical axis and is then deviated in plate 2. It is then transmitted parallel to the z optical axis onto the projection objective 3 to be displayed classically on screen 4 at the location at which the image of pixel i+1 was displayed at time t, when the plate was perpendicular to the z optical axis. The inclination of plate 2 at t+1 is such that the image of pixel i was offset with respect to its position at t when plate 2 was perpendicular to the z optical axis, by a distance d corresponding to the distance between adjacent color pixels.

Thus, if the plate was inclined at an angle −Ø at t−1, it can easily be seen that the image of pixel i occupies the place on the screen of images of pixels i−1, i and i+1 at times t−1, t and t+1 successively, when the plate is parallel to the light valve. In this way, the three colors are added in an image frame on each point of the projection screen 4.

On FIG. 2a, the image of light valve 2 passes through a device 9 comprising at least three glass plates 10, 11 and 12. In this particular example, plate 11 is parallel to light valve 1 and plates 10 and 12 are inclined on each side of this plate 11 at the same angle Ø so that the image is offset by a distance d as explained using the previous figure. This distance d is given by the following relation:

$$d = e \cdot \sin(\theta_2 - \theta_1)/\cos(\theta_2),$$

where e is the thickness of the glass plate, and $\theta_1$ and $\theta_2$ are the air/plate and plate-air angles of incidence respectively as shown on FIG. 2b, illustrating the deviation of a beam through a glass plate.

These glass plates are fixed at their bases to a motor 13, the axis of which is preferably parallel to the z optical axis of the system. The height of these plates is equal to or similar to the height of the light valve. It is possible to fix several sets of three glass plates in order to reduce its rotation frequency. For example for a device using three glass plates, the motor frequency may be 50 Hz with three plates covering one disk, each plate occupying an angle of 120°, and for a device using nine plates the angle occupied by each plate will be 40°, and its frequency could be 16.66 Hz. The motor frequency, in other words the frequency at which each plate passes in front of the light valve, must be synchronous with the line and frame frequency of the light valve and the addressing circuit multiplexer 27.

After passing through the glass plates, the image is projected through objective 14 onto projection screen 4.

Glass plates must pass through the entire beam of light valve 1. Consequently the radius of the motor arm must be adapted to the light valve beam. For example for a 1.3 inch diameter light valve with ⅓ format, a radius greater than 70 mm can be used for the plates.

Figure 3:
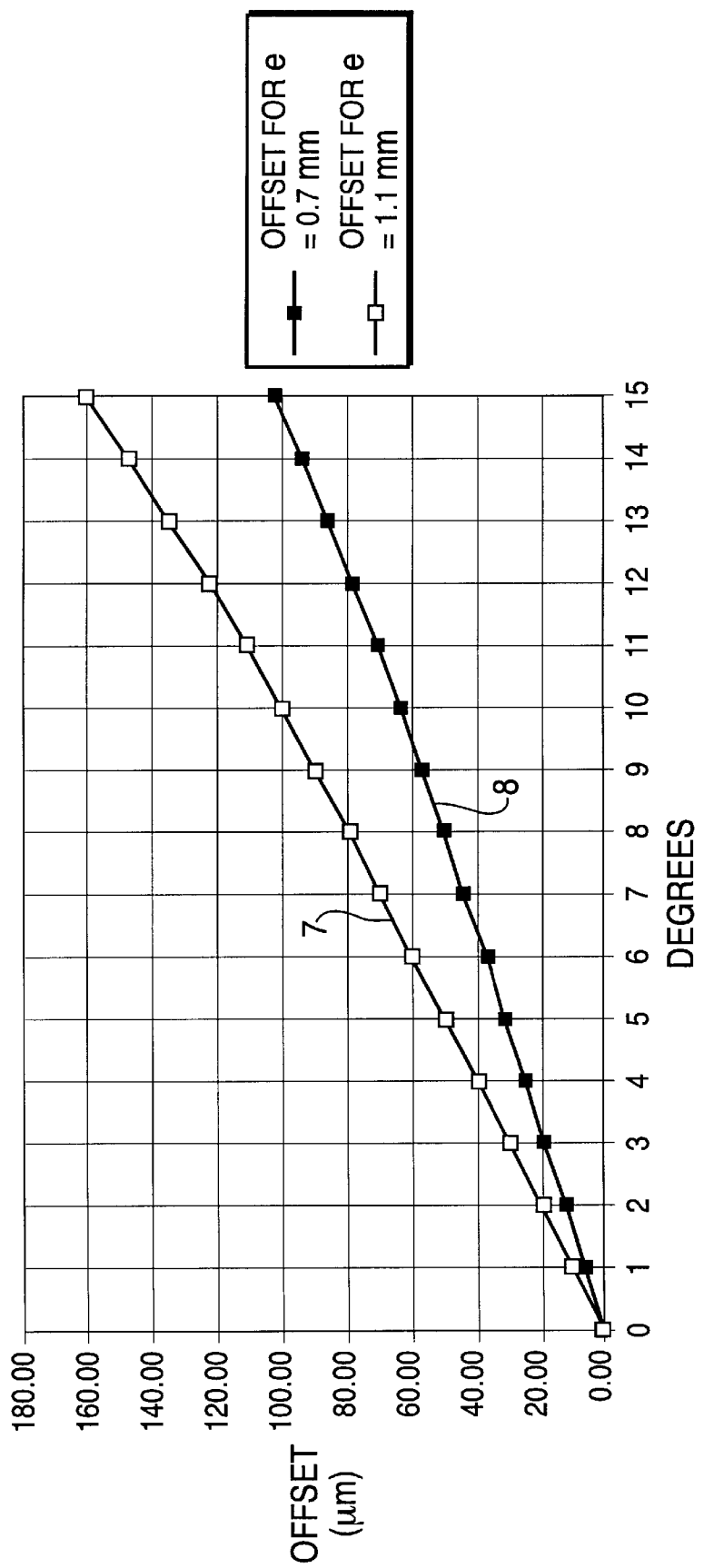
FIG. 3 shows variations of the deviations of a beam as a function of the angles of incidence on the plate for two values of the plate thickness.

FIG. 3 shows the variations of displacements d as a function of the angles of incidence $\theta_1$ for two values of the plate thickness, e=0.7 mm (curve 8) and e=1.1 mm (curve 7). It can thus be seen that the displacement d for an angle of incidence $\theta_1$ of the order of 8° and a plate thickness e of 0.7 mm is about 50 μm.

The liquid crystal addressing time is not zero. Since optical switching of pixel images takes place instantaneously in order to avoid color desaturation, it is preferable to have a narrow horizontal black strip on each glass plate. This opaque area, preferably located on each plate, blocks part of the light and allows the liquid crystal to finish switching; the loss of flux can be low if the switching time is low.

When color addressing of liquid crystal screen is done by drivers, the video signal is separated into the three colors red (R), green (G) and blue (B) by analog circuits before being displayed on the screen. The same operation is done for multiplexing three colors in the case of a single light valve system according to the invention, but the addressing time is divided by 3.

Figure 4:
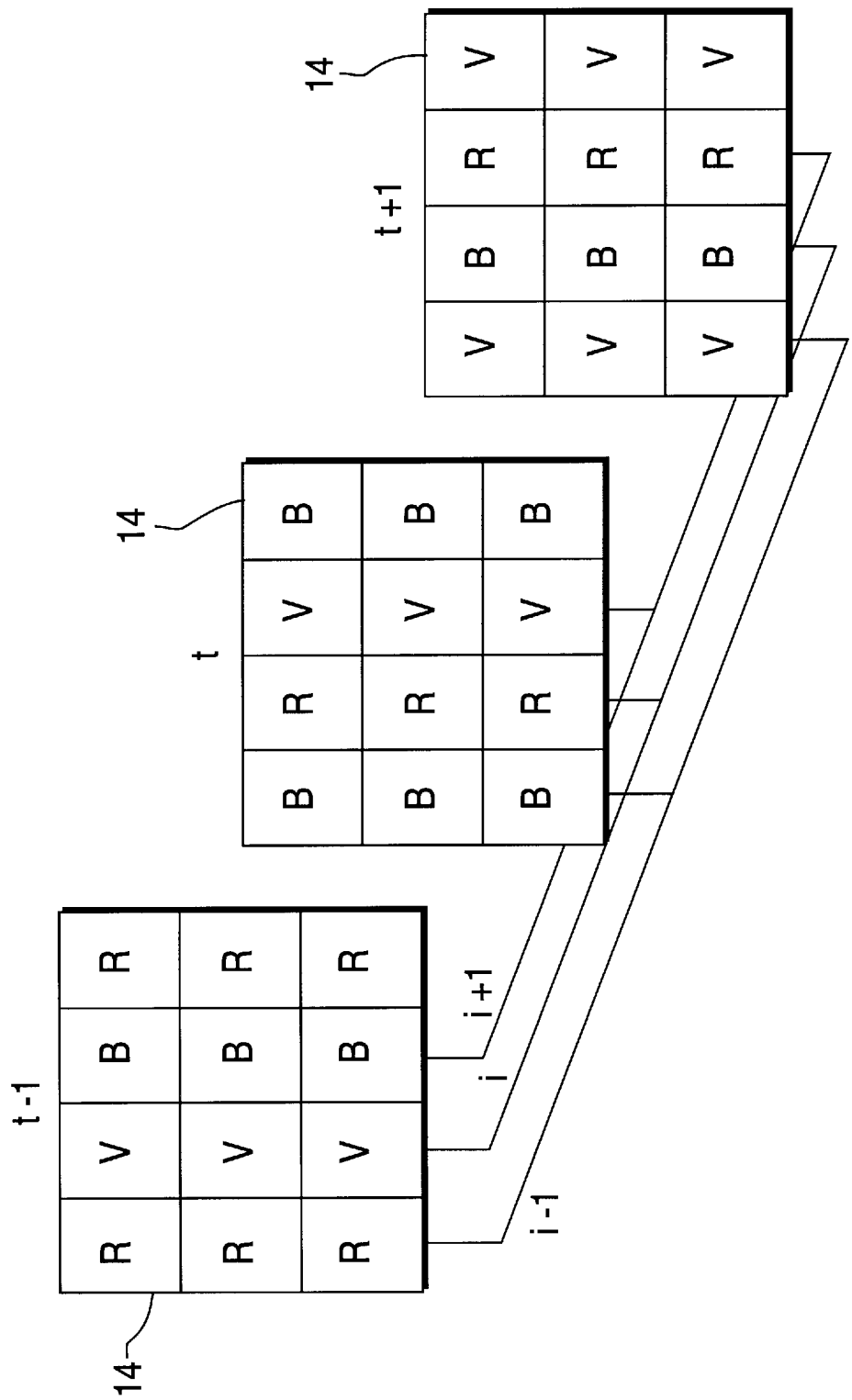
FIG. 4 shows the principle of sequencing colors according to the invention, in the case of an arrangement of color pixels in stripes.

Furthermore, this invention makes it possible to sequence the three colors such that when combined they form white. FIG. 4 shows the same set of pixels 14 at three times t−1, t and t+1. At each instant, an image made of the R, G and B pixels corresponds to three sub-frames. It is observed that three colors can be superposed in a frame, as shown in the example in FIG. 4 for pixels i−1, (R+G+B), i (B+R+G) and i+1 (G+B+R). FIG. 4 shows a structure of color pixels arranged in columns, but it is obvious that other types of structures can be used with this invention, for example in rows or in delta.

Figure 5B:
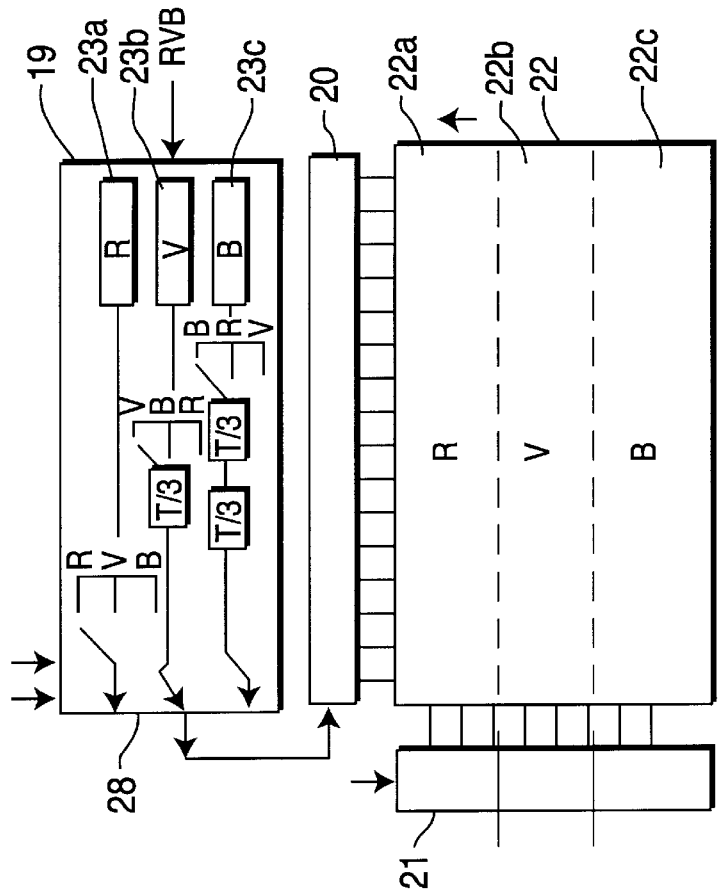
FIG. 5b shows the known method of addressing for the prism system described above.
Figure 5A:
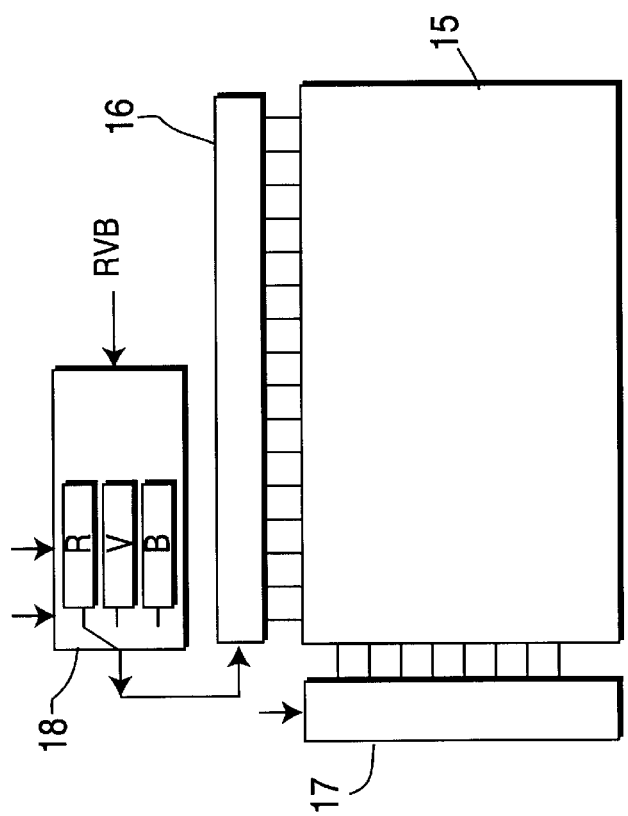
FIG. 5a shows the known method of addressing for the wheel system described above.

This invention also concerns an addressing process for the system described above. The solution of the wheel described above is addressed by the sequential mode illustrated in FIG. 5a. Each of the R, G and B images is displayed alternately starting from circuit 18 on screen 15 using drivers 16 and 17. The solution using the prism requires a very complex address mode illustrated in FIG. 5b. Screen 22 is divided into three equal horizontal areas 22a, 22b and 22c, each area being addressed by an independent row driver 21 operating sequentially. Video signals are stored in independent memories 23a, 23b and 23c, a pointer displays each of the R, G and B colors on a third of the screen by means of a T/3 and 2T/3, delay system, where T is the duration of the frame. The R, G, and B data are multiplexed at 28 to be displayed row by row by means of drivers 21 and 20.

Figure 6:
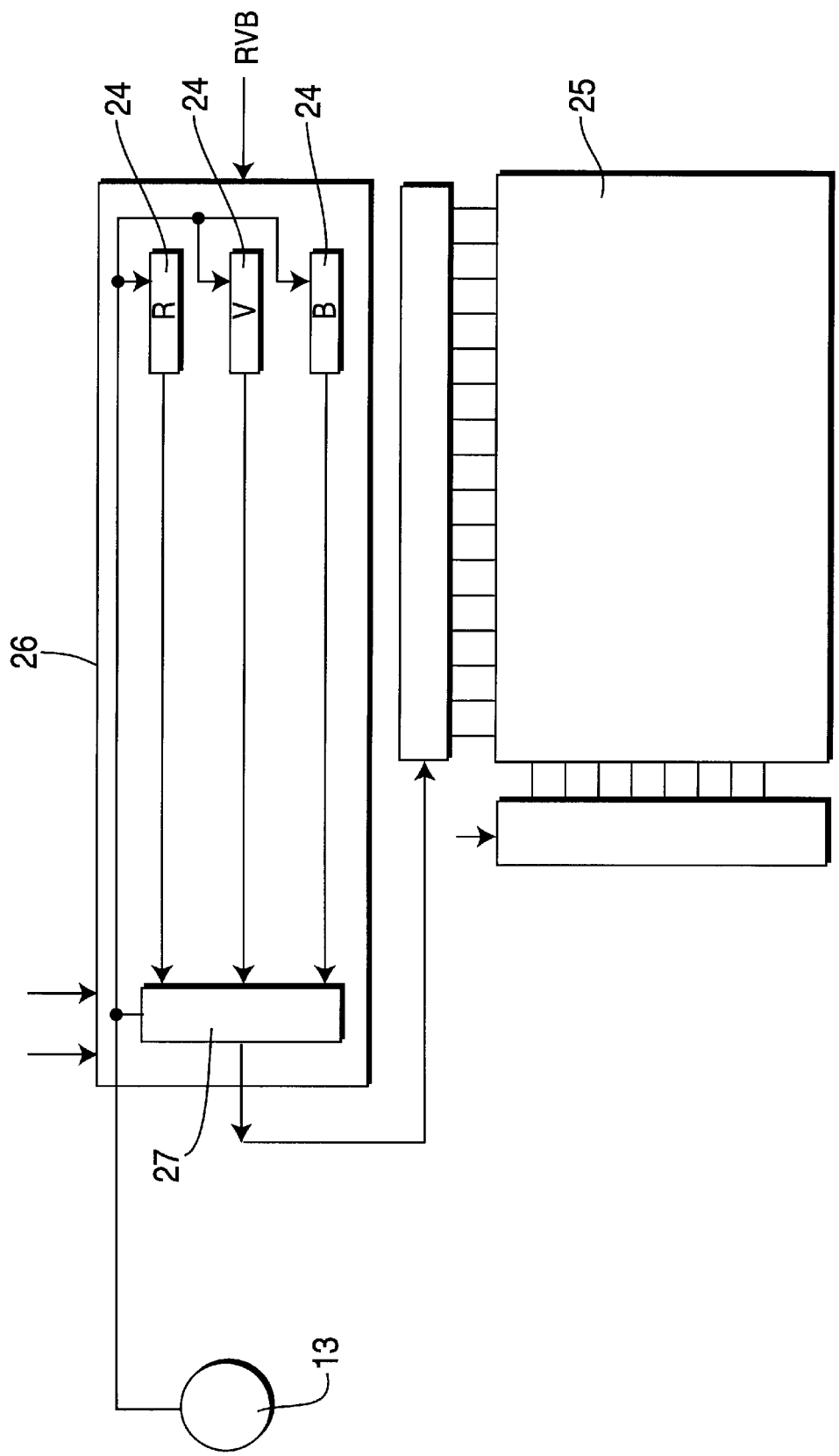
FIG. 6 shows the addressing mode of the system according to the invention.

Apart from the advantages of the invention as described above compared with these known solutions, the addressing type necessary for it illustrated by FIG. 6 is simple. For example, three R, G and B memories 24a, 23b and 23c can be provided each with the same number of addresses as there are pixels on screen 25. The common addressing pointer 26 is synchronized with multiplexer 27 and the motor 13 such that series of sub-frames of the type shown in FIG. 4 can be displayed, and an R, G or B pixel at t−1 becomes B, R and G at t and G, B and R at t+1, respectively. The phase of multiplexer 27 is synchronous with the position of the glass plates on the screen.

Another even simpler solution for addressing, since it does not need a multiplexer, could be to connect each of the outputs of the three memories 24a, 24b and 24c at each clock pulse, alternately.

This invention could also be used particularly for video projectors or for any other instrument involving the display of images by projection on a screen.

What is claimed:

1. Single light valve color projection system comprising an illuminating device lighting a color light valve controlled by an addressing device and composed of pixels an image of which is displayed through an objective on a projection screen, wherein the system also comprises at least one set of three glass plates between the light valve and the objective, the glass plates being positioned to spatially shift the image in an image plane on the projection screen.

2. System according to claim 1, wherein the set(s) of three plates are rotated by a motor about an axis parallel to an optical axis of the system and intersects an image beam.

3. A single light valve color projection system comprising an illuminating device lighting a color light valve controlled by an addressing device and composed of pixels an image of which is displayed through an objective on a projection screen wherein the system also comprises at least one set of three glass plates between the light valve and the objective wherein the plates are inclined at a given angle with respect to the others, such that any one image is offset on the projection screen by a distance equal to the distance between the geographic centers of adjacent pixels in the light valve.

4. A single light valve color projection system comprising an illuminating device lighting a color light valve controlled by an addressing device and composed of pixels an image of which is displayed through an objective on a projection screen, wherein the system also comprises at least one set of three glass plates between the light valve and the objective, wherein one of the plates in one set is parallel to the light valve, and the two others are inclined by the same positive and negative angle with respect to the first plate.

5. System according to claim 4, wherein all plates have the same thickness e, and in any one set the angle of inclination of the plates with respect to the plate parallel to the light valve is related to this thickness by the following relation:

$$d = e \; \text{Sin} \; (02-01)/\text{Cos} \; (02),$$

where d is the distance between two adjacent pixels, e is the thickness of the glass plate, 01 and 02 are the air-plate and plate-air angles of incidence of the plates respectively.

6. System according to claim 1, wherein the system further comprises a single set of plates.

7. A single light valve color projection system comprising an illuminating device lighting a color light valve controlled by an addressing device and composed of pixels an image of which is displayed through an objective on a projection screen, wherein the system also comprises three sets of plates between the light valve and the objective.

8. System according to claim 2, wherein all plates are fixed at their bases to a motor the axis of which is parallel to the optical axis of the system.

9. System according to claim 8, wherein the motor frequency is synchronous with a row and frame frequency of the light valve and with an addressing device multiplexer.

10. System according to claim 8, wherein there is an opaque area along the motor radius of each plate.

11. System according to claim 1, wherein the light valve is a liquid crystal screen.

12. System according to claim 11, wherein the pixels of the light valve are disposed in a delta configuration.

13. Addressing process for a system as defined by claim 1, wherein a memory is provided for each of a red, green and blue colors, with one address for each pixel on the light valve, a pointer of a common addressing bus being synchronized with a multiplexer.

14. Addressing process for a system as defined in claim 1, wherein a memory is provided for each of the red, green and blue colors, with one address for each pixel on the light valve, each of the outputs of the three memories conducting alternately on each clock pulse.

* * * * *